(12) United States Patent
Ikeda et al.

(10) Patent No.: US 9,868,175 B2
(45) Date of Patent: Jan. 16, 2018

(54) SEAM WELDING METHOD AND SEAM WELDING DEVICE (71) Applicant: HONDA MOTOR CO., LTD., Tokyo (JP)

(72) Inventors: Takafumi Ikeda, Tochigi-ken (JP); Mitsugu Kaneko, Utsunomiya (JP); Noriko Kurimoto, Utsunomiya (JP); Kazuhiko Yamaashi, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/917,166

(22) PCT Filed: Sep. 9, 2013

(86) PCT No.: PCT/JP2013/074196
§ 371 (c)(1),
(2) Date: Mar. 7, 2016

(87) PCT Pub. No.: WO2015/033460
PCT Pub. Date: Mar. 12, 2015

(65) Prior Publication Data
US 2016/0207138 A1    Jul. 21, 2016

(51) Int. Cl.
*B23K 11/06* (2006.01)
*B23K 11/16* (2006.01)
(Continued)

(52) U.S. Cl.
CPC ........ B23K 11/061 (2013.01); B23K 11/0033 (2013.01); B23K 11/16 (2013.01);
(Continued)

(58) Field of Classification Search
CPC ... B23K 11/0033; B23K 11/061; B23K 11/16; B23K 11/20; B23K 2203/04;
(Continued)

(56) References Cited

U.S. PATENT DOCUMENTS 2,892,921 A * 6/1959 Mecklenborg ..... B23K 11/0026
219/102
2011/0120979 A1 * 5/2011 Kaga ................... B23K 11/061
219/102

(Continued)

FOREIGN PATENT DOCUMENTS

JP    2007-167896    7/2007
JP    2013-188763    9/2013

OTHER PUBLICATIONS

International Search Report, dated Nov. 5, 2013 (Nov. 5, 2013).
Canadian Office Action dated Dec. 1, 2016.

*Primary Examiner* — Quang D Thanh
*Assistant Examiner* — Ket D Dang
(74) *Attorney, Agent, or Firm* — Rankin, Hill & Clark LLP (57) ABSTRACT

A seam welding device sandwiches between a first roller electrode and a second roller electrode a laminate, which is formed by laminating a plurality of workpieces and disposing the thinnest workpiece, which has the smallest thickness among the workpieces, on the outside, to carry out seam welding. The second roller electrode, which is in contact with the thinnest workpiece, is disposed further along the direction of welding progress than the first roller electrode.

6 Claims, 11 Drawing Sheets (51) Int. Cl.
*B23K 11/20* (2006.01)
*B23K 11/00* (2006.01)
B23K 103/04 (2006.01)
B23K 103/18 (2006.01)

(52) U.S. Cl.
CPC .......... *B23K 11/20* (2013.01); *B23K 2203/04* (2013.01); *B23K 2203/18* (2013.01)

(58) Field of Classification Search
CPC ............ B23K 2203/18; B23K 11/3036; B23K 11/3045; B23K 20/103; B23K 11/06
USPC ........ 219/117.1, 118, 119, 91.2, 136, 137 R, 219/6.9, 612–614, 619, 102, 104, 18, 219/81–84
See application file for complete search history.

(56) References Cited

U.S. PATENT DOCUMENTS

| | | | |
|---|---|---|---|
| 2011/0233173 A1* | 9/2011 | Kaneko ................ | B23K 11/002 219/83 |
| 2012/0074103 A1* | 3/2012 | Hasegawa ............ | B23K 11/061 219/102 |

* cited by examiner

SEAM WELDING METHOD AND SEAM WELDING DEVICE

TECHNICAL FIELD

The present invention relates to a seam welding method and a seam welding device for performing seam welding with respect to a stacked assembly, which is formed by stacking a plurality of workpieces (includes a plurality of workpieces stacked), wherein among the workpieces, a thinnest workpiece having a minimum thickness is arranged on an outermost side of the stacked assembly.

BACKGROUND ART

Seam welding is widely known as a technique for joining metal plates together (for example, see Japanese Laid-Open Patent Publication No. 2007-167896). Using seam welding, after stacked metal plates (stacked assembly) are sandwiched between a pair of roller electrodes, a current is applied between the roller electrodes. More specifically, within the stacked assembly, a current pathway is formed along the stacking direction. A current that flows out from the plus electrode is conducted successively through the metal plate in contact with the plus electrode, contact sites between the metal plates, and the metal plate in contact with the minus electrode, whereupon the current reaches the minus electrode.

During application of current, resistance heating (Joule heat) is generated at the contact sites between the metal plates. Thus, melting takes place at such sites.

Thereafter, by the stacked assembly being moved relative to the pair of roller electrodes, the current pathway also moves, so that ultimately, the sites at which resistance heating occurs in the stacked assembly move as well. That is, the current moves away from the sites that have been melted prior to such movement, and therefore, resistance heating of the sites is completed. As a result, the temperature at the sites decreases, whereby the sites become solidified and acquire a solid phase. Such solidified sites are referred to primarily as nuggets.

On the other hand, at the sites corresponding to the newly formed current pathway, in the same manner as described above, the contact sites between the metal plates undergo melting. Thereafter, by sequentially repeating the above-described phenomenon, the metal plates are joined continuously to each other.

SUMMARY OF INVENTION

Incidentally, as the stacked assembly, a structure exists in which plural metal plates of different thicknesses are stacked. In addition, in the case that the workpiece (thinnest workpiece) with the smallest thickness is seam welded while being stacked on the outermost side of the stacked assembly, a situation occurs in which nuggets do not grow sufficiently between the thinnest workpiece and the other workpiece adjacent to the thinnest workpiece. The reason therefor is assumed to be that adequate resistance heating does not occur, due to the fact that the specific resistance is minimal as a result of the thickness of the thinnest workpiece being smallest. Although it can be considered to increase the current value so that nuggets grow sufficiently large in the vicinity of the thinnest workpiece, in this case, a defect is brought about in that so-called spatter (welding debris), a phenomenon that the workpiece is melted and undergoes scattering, is easily caused.

The present invention has been devised taking into consideration the aforementioned problems, and has the object of providing a seam welding method and a seam welding device, which enable nuggets of sufficient size to be formed between a thinnest workpiece arranged on an outermost side of a stacked assembly and a workpiece adjacent to the thinnest workpiece, while also dispelling any concerns over generation of welding debris.

[1] A seam welding method according to the present invention is characterized by performing seam welding by sandwiching a stacked assembly between a pair of roller electrodes, the stacked assembly comprising a plurality of workpieces stacked, together with arranging a thinnest workpiece having a smallest thickness on an outermost side, wherein, in a state in which one of the roller electrodes in contact with the thinnest workpiece is arranged more forwardly in the welding direction than the other roller electrode, supply of current is carried out between the pair of roller electrodes while the pair of roller electrodes is moved relatively with respect to the stacked assembly.

In accordance with the seam welding method according to the present invention, since the one roller electrode in contact with the thinnest workpiece is disposed more forwardly in the welding direction than the other roller electrode, in the stacked assembly, a current pathway, which is inclined in a direction opposite to the welding direction, is formed from the one roller electrode toward the other roller electrode. When this is done, in the current pathway, at a certain point in time T1, resistance heating occurs at a contact site (first contact site) between the thinnest workpiece and the workpiece adjacent to the thinnest workpiece. In addition, at a point in time T2 at which the pair of roller electrodes is moved relatively with respect to the stacked assembly, a second site adjacent to the first site in the welding direction is heated, together with a third site adjacent to the other roller electrode side of the first site being heated. At this time, the first site, which already has been heated, is increased in heat further by the second site and the third site, and therefore, a nugget (well-proportioned nugget) of a sufficient size is formed at the first site. Consequently, a joint is obtained which is superior in bonding strength.

Further, in the case that the one roller electrode is arranged more forwardly in the welding direction than the other roller electrode, in comparison with a situation in which the two roller electrodes are aligned at the same position in the welding direction, the contact area of the respective roller electrodes with respect to the stacked assembly becomes larger, together with the contact area between the workpieces becoming larger. Consequently, since the current density of the current pathway is comparatively small, even in the case that the current value flowing between the pair of roller electrodes is increased, the occurrence of welding debris can suitably be suppressed.

[2] In the aforementioned seam welding method, there may be carried out a calculating step of calculating a ratio of a thickness of the stacked assembly with respect to the thickness of the thinnest workpiece, and a setting step of setting an angle of inclination along the welding direction of a line segment that passes through axes of rotation of the respective roller electrodes with respect to a line segment along a stacking direction of the stacked assembly, depending on the ratio calculated in the calculating step.

According to such a method, since the angle of inclination is set corresponding to the ratio of the thickness of the stacked assembly with respect to the thickness of the thinnest workpiece, nuggets that are sufficiently large in size can efficiently be formed in the stacked assembly.

[3] In the aforementioned seam welding method, in the setting step, the angle of inclination may be set to 5° or less. According to such a method, since the angle of inclination is set to 5° or less, it is possible to prevent the pair of roller electrodes from becoming excessively distanced from one another. Consequently, nuggets of sufficient size can be formed more effectively in the stacked assembly.

[4] A seam welding device according to the present invention is characterized by performing seam welding by sandwiching a stacked assembly between a pair of roller electrodes, the stacked assembly comprising a plurality of workpieces stacked, together with arranging a thinnest workpiece having a smallest thickness on an outermost side, wherein one of the roller electrodes in contact with the thinnest workpiece is arranged more forwardly in the welding direction than the other roller electrode.

In accordance with the seam welding device according to the present invention, since the one roller electrode in contact with the thinnest workpiece is disposed more forwardly in the welding direction than the other roller electrode, the same effects as those of the aforementioned seam welding method can be offered.

[5] In the aforementioned seam welding device, there may be provided a ratio calculating unit configured to calculate a ratio of a thickness of the stacked assembly with respect to the thickness of the thinnest workpiece, and an inclination angle setting unit configured to set an angle of inclination along the welding direction of a line segment that passes through axes of rotation of the respective roller electrodes with respect to a line segment along a stacking direction of the stacked assembly, based on the ratio calculated by the ratio calculating unit.

According to such a device, since the angle of inclination is set based on the ratio that is calculated by the ratio calculating unit, nuggets that are sufficiently large in size can efficiently be formed in the stacked assembly.

[6] In the aforementioned seam welding device, the inclination angle setting unit may set the angle of inclination to 5° or less. According to such a device, since the angle of inclination is set to 5° or less, it is possible to prevent the pair of roller electrodes from becoming excessively distanced from one another. Consequently, nuggets of sufficient size can be formed more effectively in the stacked assembly.

As has been described above, according to the present invention, since the one roller electrode in contact with the thinnest workpiece is disposed more forwardly in the welding direction than the other roller electrode, nuggets of sufficient size can be formed in the stacked assembly between the thinnest workpiece arranged on the outermost side and a workpiece that lies adjacent to the thinnest workpiece. In addition, since the contact area between the workpieces and the contact area of the respective roller electrodes with respect to the stacked assembly can be made larger, any concerns over generation of welding debris can be dispensed with.

DESCRIPTION OF EMBODIMENTS

In relation to a seam welding method and a seam welding device that implements such a method according to the present invention, preferred embodiments of the present invention will be described in detail below with reference to the accompanying drawings.

Figure 1:
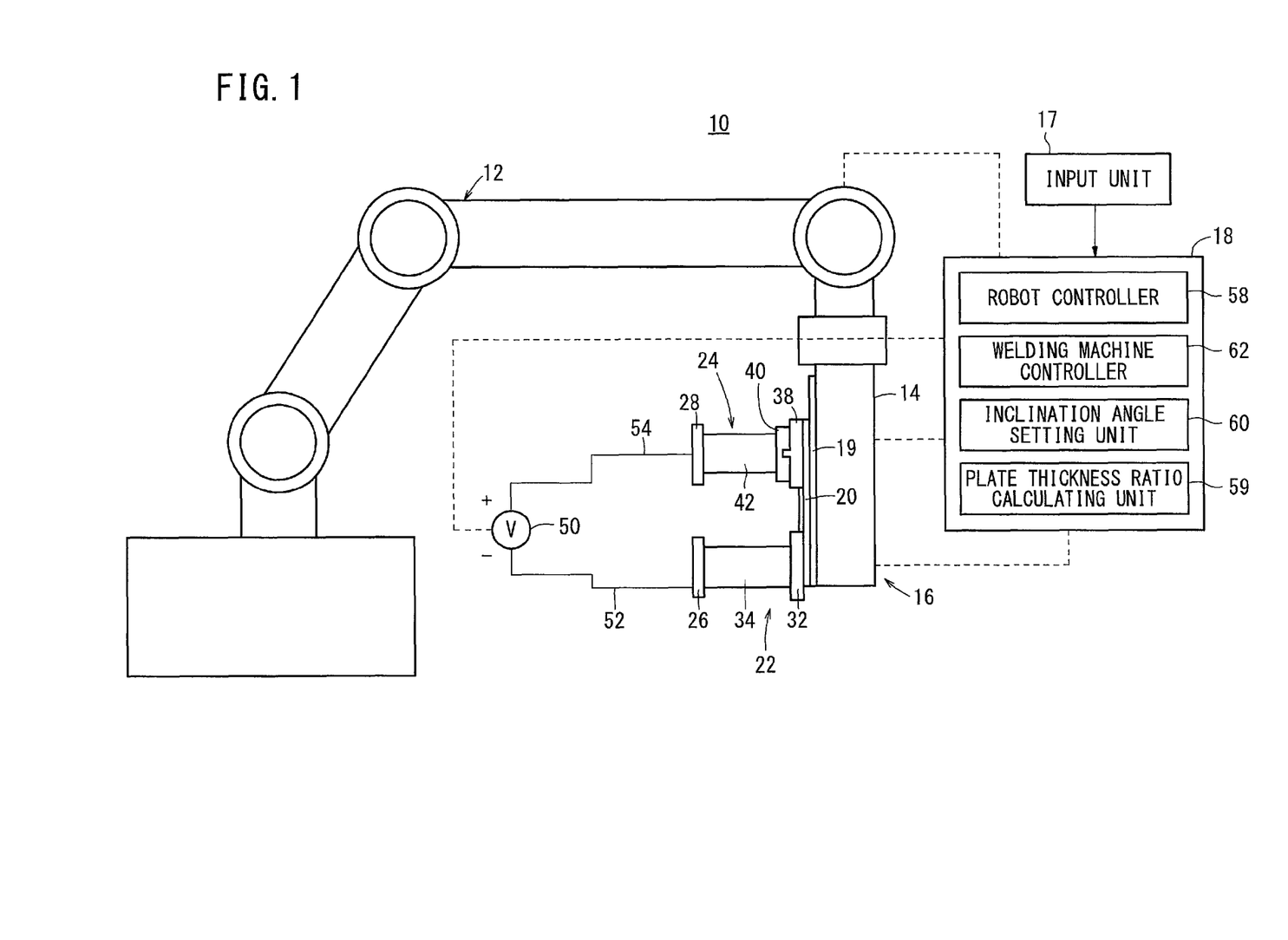
FIG. 1 is an overall side view in outline form of a seam welding device according to an embodiment of the present invention.
Figure 2:
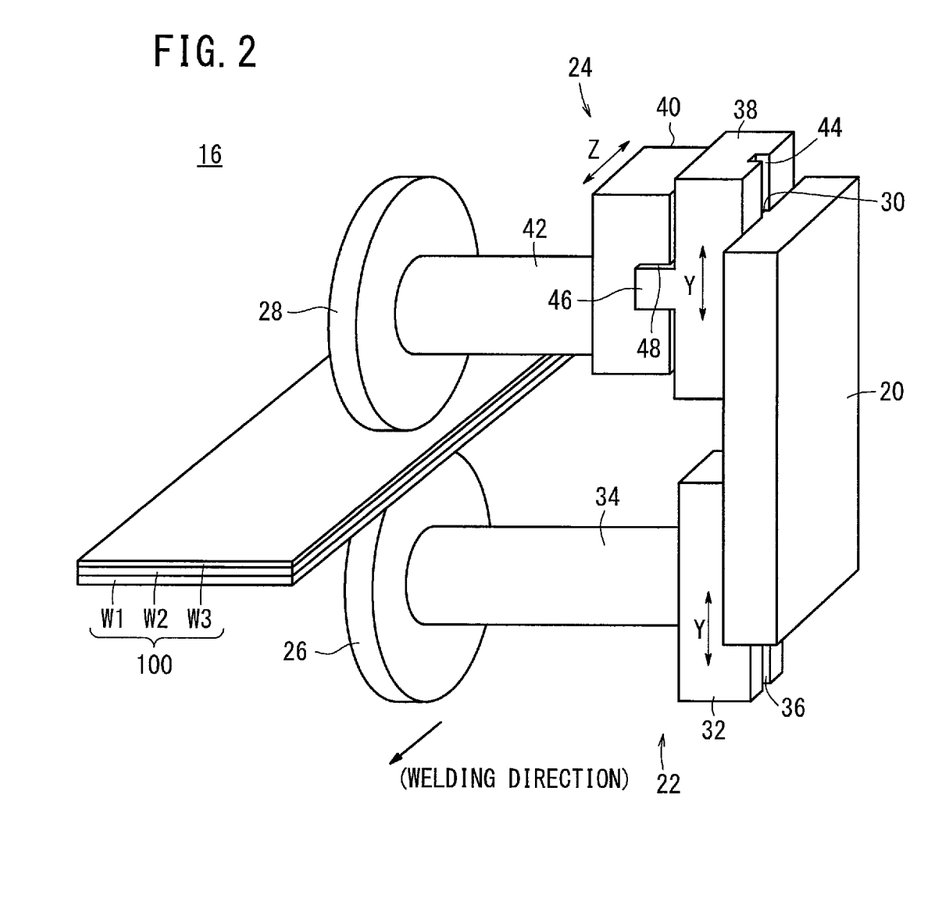
FIG. 2 is a perspective view of a seam welding machine shown in FIG. 1.

As shown in FIGS. 1 and 2, a seam welding device 10 according to an embodiment of the present invention performs seam welding on a stacked assembly 100 that serves as an object to be welded, and is equipped with a multi-jointed articulated robot 12, a seam welding machine 16 supported on a distal end arm 14 of the articulated robot 12, an input unit 17, and a control unit 18.

First, a description will be given concerning the stacked assembly 100. The stacked assembly 100 according to the present invention is a member that is used as a door opening portion of an automobile, which is formed by stacking three workpieces (metal plates) W1, W2, W3.

The workpiece W1, for example, is made up from high-tensile steel such as JAC590, JAC780 or JAC980 (high-performance high-tensile steel sheets defined according to the Japan Iron and Steel Federation Standard), and forms one outermost layer (outermost surface) of the stacked assembly 100. The workpiece W2 is made up from the same material (high-tensile material) as the aforementioned workpiece W1, and forms a middle layer of the stacked assembly 100. The workpiece W3, for example, is made up from JAC270 (a so-called mild steel, which is a high-performance steel sheet for press-forming defined according to the Japan Iron and Steel Federation Standard), and forms the other outermost layer (outermost surface) of the stacked assembly 100.

Therefore, in the stacked assembly 100 of the present embodiment, in comparison with the workpiece W1 and the workpiece W2, which are high-tensile steel materials, the workpiece W3, which is a mild steel material, has a characteristic of being relatively difficult to generate heat therein, due to the fact that the specific resistance thereof is low and the thermal conductivity thereof is high.

Figure 3:
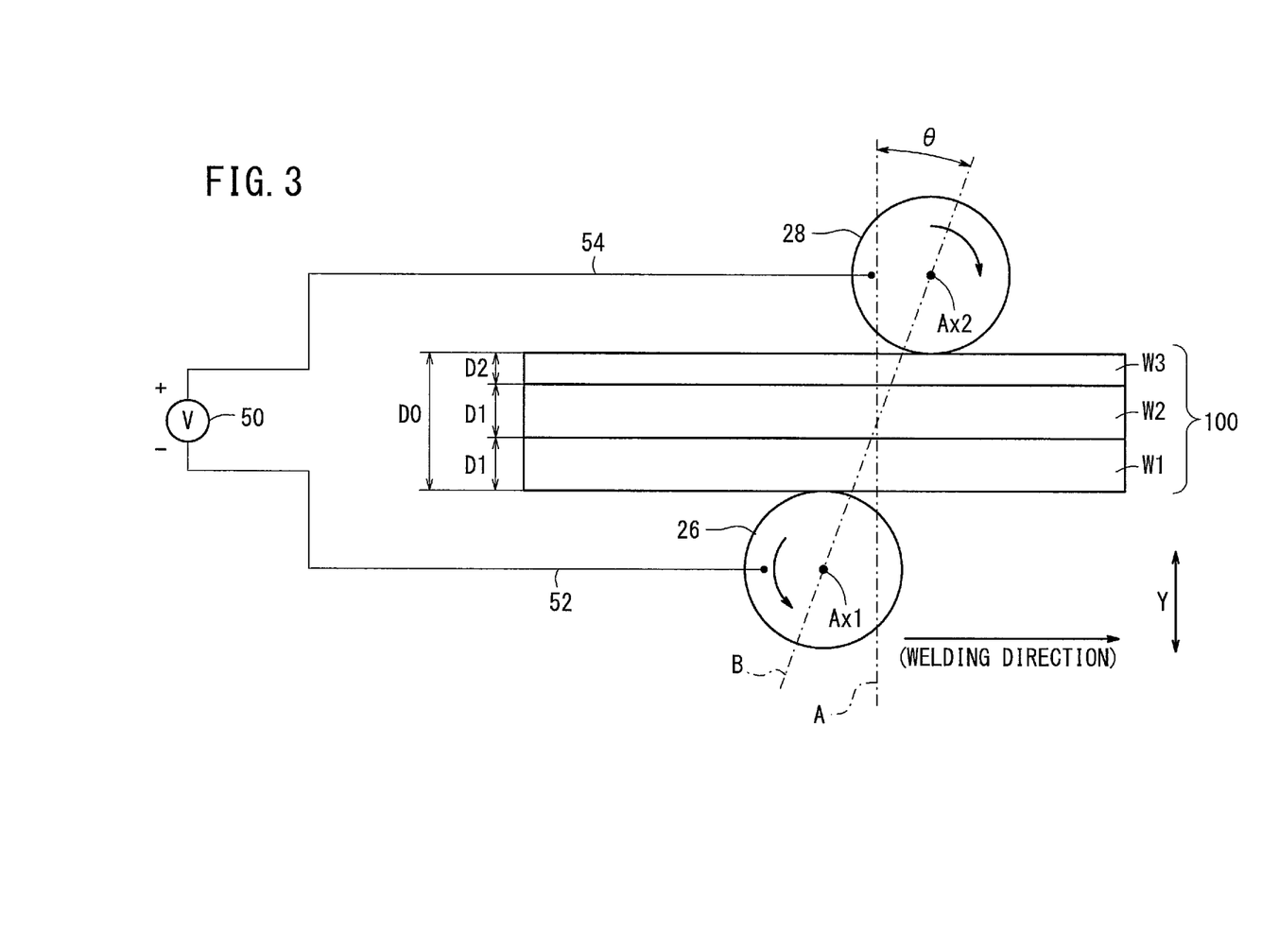
FIG. 3 is a schematic partial front view of the seam welding machine.

As understood from FIG. 3, the thickness of the workpiece W1 and the thickness of the workpiece W2 are set to D1 (e.g., roughly 1 mm to roughly 2 mm), whereas the thickness of the workpiece W3 is set to a smaller dimension D2 (e.g., roughly 0.5 mm to roughly 0.7 mm) than the thickness D1. Stated otherwise, the workpiece W3 is the thinnest workpiece of the stacked assembly 100. The thickness of the workpiece W1 and the thickness of the workpiece W2 need not be the same and may differ from each other.

The articulated robot 12 is configured as a so-called industrial robot. Under the action of the control unit 18, the articulated robot 12 can move the seam welding machine 16 in an arbitrary posture and at an arbitrary position (see FIG. 1).

The seam welding machine 16 includes a guide rail 20, which is fixed through a mount 19 with respect to the distal end arm 14 of the articulated robot 12, a first drive mechanism 22 and a second drive mechanism 24, which are disposed on the guide rail 20, a first roller electrode 26, which is disposed on the first drive mechanism 22, and a second roller electrode 28, which is disposed on the second drive mechanism 24.

The guide rail 20 is configured in a rectangular parallelepiped shape, and substantially in a central part in the widthwise direction (the direction of the arrow Z in FIG. 2) of a surface on an opposite side from the side on which the distal end arm 14 is positioned, a protrusion 30 is formed that spans across the entire length thereof.

The first drive mechanism 22 includes a first moving table 32 disposed movably with respect to the guide rail 20 along the direction of extension (the direction of the arrow Y) of the guide rail 20, and a first rotary shaft 34 disposed on the first moving table 32 and to which the first roller electrode 26 is fixed.

A recess 36, which engages slidably with the protrusion 30 of the guide rail 20, is formed on the first moving table 32. By a first cylinder and a first rod (not illustrated), for example, which are provided on the guide rail 20, the first moving table 32 is capable of moving with respect to the guide rail 20 along the direction of extension of the guide rail 20.

The first rotary shaft 34 extends along the thickness direction (the direction perpendicular to the direction of the arrow Y and the direction of the arrow Z) of the guide rail 20, and is capable of being rotated by a non-illustrated first rotary motor that is disposed on the first moving table 32.

The second drive mechanism 24 includes a second moving table 38 disposed movably with respect to the guide rail 20 along the direction of extension (the direction of the arrow Y) of the guide rail 20, a third moving table 40 disposed movably with respect to the second moving table 38 along the widthwise direction (the direction of the arrow Z in FIG. 2) of the guide rail 20, and a second rotary shaft 42 disposed on the third moving table 40 and to which the second roller electrode 28 is fixed.

A recess 44, which engages slidably with the protrusion 30 of the guide rail 20, is formed on the second moving table 38. By a second cylinder and a second rod (not illustrated), for example, which are provided on the guide rail 20, the second moving table 38 is capable of moving with respect to the guide rail 20 along the direction of extension of the guide rail 20. On a surface on an opposite side from the surface on which the recess 44 is formed in the second moving table 38, a protrusion 46 is formed that spans across the entire length of the guide rail 20.

A recess 48, which engages slidably with the protrusion 46 of the second moving table 38, is formed on the third moving table 40. By a third cylinder and a third rod (not illustrated), for example, which are provided on the second moving table 38, the third moving table 40 is capable of moving with respect to the second moving table 38 along the widthwise direction (the direction of the arrow Z) of the guide rail 20.

The second rotary shaft 42 is capable of being rotated by a non-illustrated second rotary motor that is disposed on the third moving table 40 in a state of being arranged parallel to the first rotary shaft 34.

Each of the first roller electrode 26 and the second roller electrode 28 is formed in a disc shape. As understood from FIGS. 2 and 3, an outer circumferential surface of the first roller electrode 26 contacts one surface of the stacked assembly 100 (workpiece W1), and an outer circumferential surface of the second roller electrode 28 contacts the other surface of the stacked assembly 100 (workpiece W3). The first roller electrode 26 and the second roller electrode 28 may be formed with the same structure, and may be formed such that the two electrodes differ in a dimension in the diametrical direction or in the widthwise direction.

The seam welding machine 16 includes a welding power source unit 50, a first lead wire (power line) 52 that electrically connects the first roller electrode 26 and a negative electrode of the welding power source unit 50, and a second lead wire (power line) 54 that electrically connects the second roller electrode 28 and a positive electrode of the welding power source unit 50 (see FIGS. 1 and 3).

The welding power source unit 50 is constituted to include an AC power source and a welding transformer, etc., and performs supply of current between the first roller electrode 26 and the second roller electrode 28 through the first lead wire 52 and the second lead wire 54.

The input unit 17 is capable of inputting information with respect to the control unit 18, such as the plate thicknesses of the respective workpieces W1 to W3 that make up the stacked assembly 100.

The control unit 18 includes a robot controller 58, a plate thickness ratio calculating unit 59, an inclination angle setting unit 60, and a welding machine controller 62. The robot controller 58 controls driving of the articulated robot 12.

The plate thickness ratio calculating unit 59 calculates the ratio (plate thickness ratio R=D2/D0) of the thickness D0 of the stacked assembly 100 with respect to the thickness D2 of the workpiece (thinnest workpiece) W3, based on the thickness information, etc., of the respective workpieces W1 to W3, which is input from the input unit 17.

The inclination angle setting unit 60 sets the angle of inclination θ of a line segment B along the welding direction with respect to a line segment A along the stacking direction (the direction of the arrow Y) of the stacked assembly 100, based on the plate thickness ratio R calculated by the plate thickness ratio calculating unit 59 (see FIG. 3). The line segment B passes through the axis of rotation Ax1 of the first roller electrode 26 and the axis of rotation Ax2 of the second roller electrode 28. More specifically, the inclination angle setting unit 60 sets the angle of inclination θ to become larger as the plate thickness ratio R becomes larger. By setting the angle of inclination θ in this manner, the second roller electrode 28 is arranged more forwardly in the welding direction than the first roller electrode 26.

According to the present embodiment, the inclination angle setting unit 60 sets the angle of inclination θ to less than or equal to 7°, and more preferably, to less than or equal to 5°. By setting the angle of inclination in this manner, excessive separation between the first roller electrode 26 and the second roller electrode 28 can be suppressed.

Further, in the case that the plate thickness ratio R is greater than 5, the inclination angle setting unit 60 preferably sets the angle of inclination θ within a range of 3°≤θ≤5°, and in the case that the plate thickness ratio R is less than or equal to 3, the inclination angle setting unit 60 preferably sets the angle of inclination θ to be approximately 1°.

This is because, if the angle of inclination θ is too small, it becomes difficult for the contact site between the workpiece W2 and the workpiece W3 to be sufficiently heated, whereas if the angle of inclination θ is too large, the current pathway formed in the stacked assembly 100 becomes excessively long (the interval between the first roller electrode 26 and the second roller electrode 28 is too wide), and the welding current value needed to perform seam welding becomes excessively large.

The welding machine controller 62 controls the first through third cylinders, the first and second rotary motors, and the welding power source unit 50.

The seam welding device 10 according to the present embodiment is constructed basically as has been described above. Next, effects and advantages of the seam welding device 10 will be described in relation to a seam welding method according to the embodiment.

Figure 4:
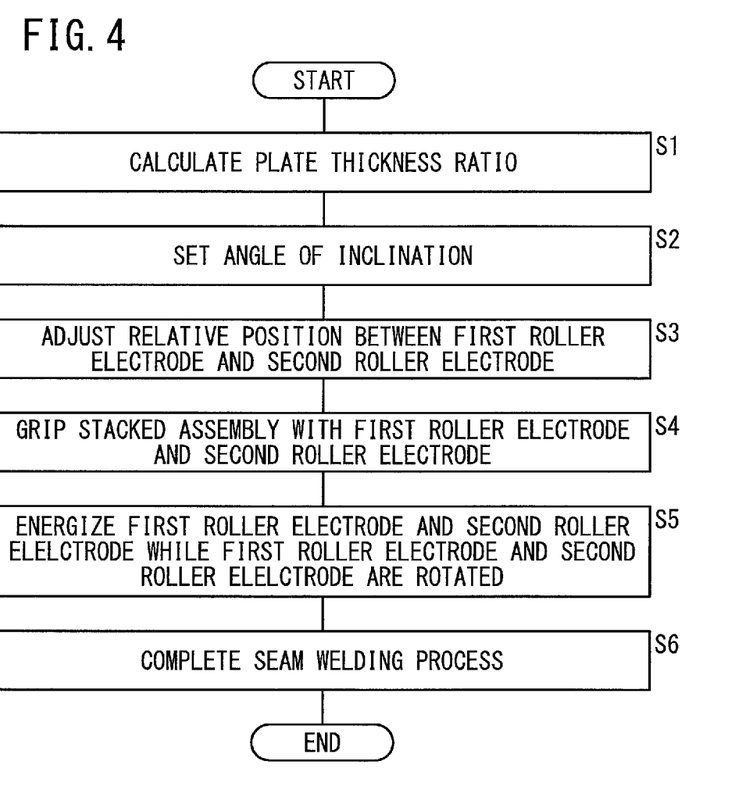
FIG. 4 is a flowchart for describing a seam welding method according to an embodiment of the present invention.

First, the plate thickness ratio calculating unit 59 calculates the plate thickness ratio R by obtaining information of the thickness dimensions of the respective workpieces W1 to W3 (step S1 of FIG. 4). The thickness dimensions of the respective workpieces W1 to W3 may be obtained by the operator making an input to the input unit 17, or may be obtained from workpiece information (information of the thickness dimensions of each of the workpieces) stored in advance in a storage unit or the like of the control unit 18.

Next, the inclination angle setting unit 60 sets the angle of inclination θ based on the calculated thickness ratio R (step S2). More specifically, the inclination angle setting unit 60 sets the angle of inclination θ to become larger as the plate thickness ratio R becomes larger. At this time, the inclination angle setting unit 60 sets the angle of inclination θ within a range of 3°≤θ≤5°, for example.

Next, the relative positions of the first roller electrode 26 and the second roller electrode 28 are adjusted so as to bring about the set angle of inclination θ (step S3). More specifically, by controlling the pressure in the third cylinder, the welding machine controller 62 moves the third moving table 40 in the direction of the arrow Z, whereby the second roller electrode 28 is moved more forwardly in the welding direction than the first roller electrode 26, and the angle of inclination θ is placed at the set value.

Thereafter, the stacked assembly 100 is sandwiched and gripped between the first roller electrode 26 and the second roller electrode 28 (step S4). More specifically, at first, the robot controller 58 controls the articulated robot 12, moves the seam welding machine 16 to the vicinity of a welding starting point of the stacked assembly 100, and adjusts the posture of the seam welding machine 16 to position the first roller electrode 26 on the side of the workpiece W1 and to position the second roller electrode 28 on the side of the workpiece W3. In addition, by controlling the pressures in the first and second cylinders, the welding machine controller 62 causes the first roller electrode 26 and the second roller electrode 28 to approach one another mutually. Consequently, the outer circumferential surface of the first roller electrode 26 contacts one surface of the workpiece W1, together with the outer circumferential surface of the second roller electrode 28 contacting the other surface of the workpiece W3.

Figure 5:
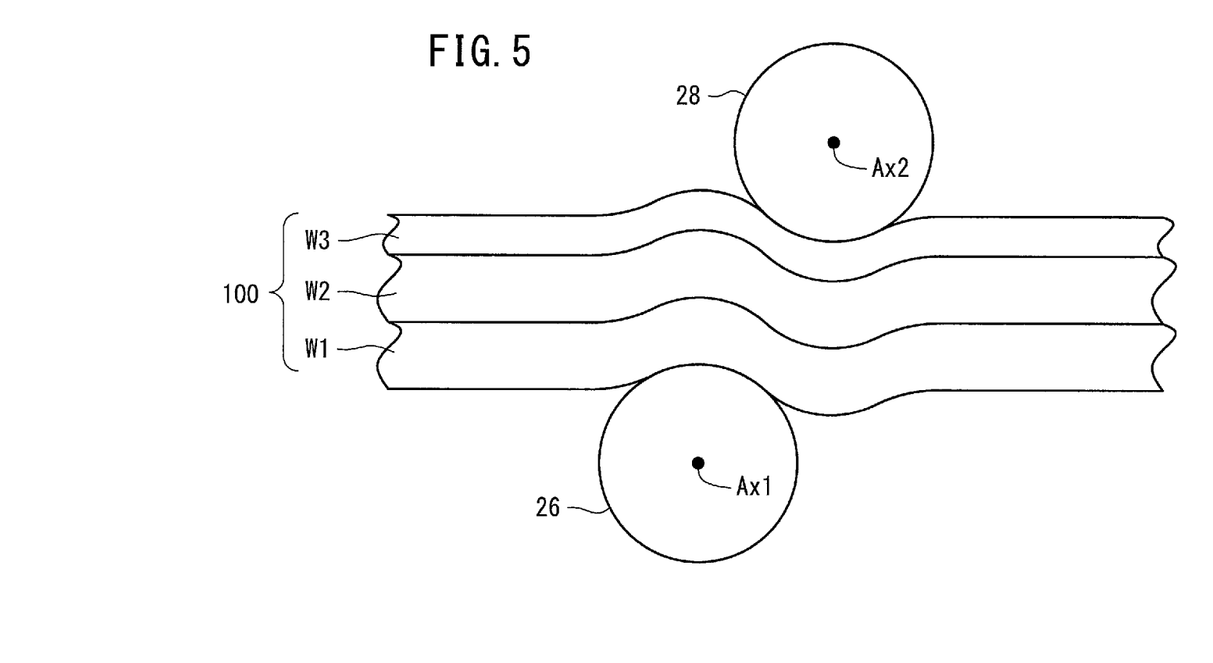
FIG. 5 is an explanatory drawing for describing a state in which a site within a stacked assembly is sandwiched by a first roller electrode and a second roller electrode, and the site is warped.
Figure 6:
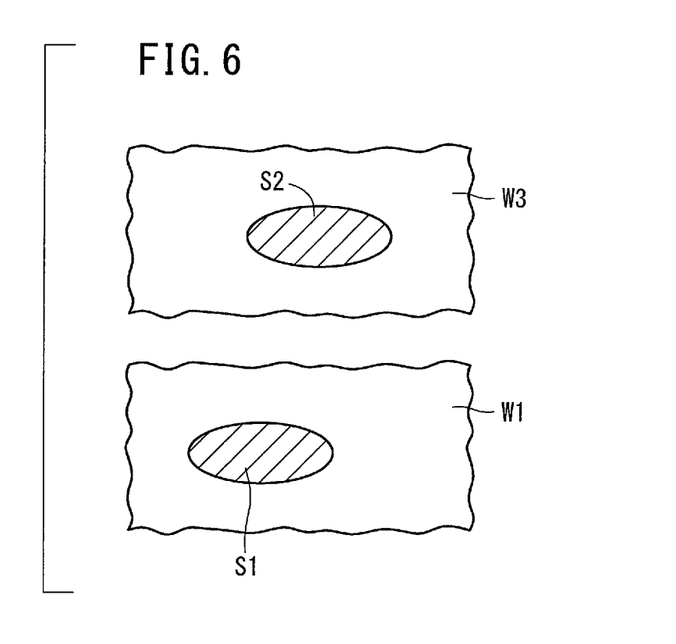
FIG. 6 is a schematic explanatory drawing for describing a contact area of the first roller electrode with respect to a first workpiece, and a contact area of the second roller electrode with respect to a third workpiece.

As a result, the stacked assembly 100 is pressed and sandwiched by the first roller electrode 26 and the second roller electrode 28. Part of the stacked assembly 100 which has been sandwiched is warped corresponding to the shapes of the roller electrodes 26, 28 (see FIG. 5). Therefore, compared to the case where the roller electrodes 26, 28 are aligned in the welding direction, a contact area S1 of the first electrode 26 on the workpiece W1 increases along the welding direction and the widthwise direction of the first roller electrode 26, and a contact area S2 of the second roller electrode 26 on the workpiece W3 also increases along the opposite direction of the welding direction and the widthwise direction of the second roller electrode 28 (see FIG. 6).

Subsequently, seam welding is carried out by supplying current while the first roller electrode 26 and the second roller electrode 28 undergo rotation (rolling) (step S5). More specifically, the robot controller 58 controls the articulated robot 12, and while the seam welding machine 16 is moved, the welding machine controller 62 rotates the first roller electrode 26 by driving the first rotary motor, and rotates the second roller electrode 28 by driving the second rotary motor. At roughly the same time, the welding machine controller 62 carries out supply of current between the first roller electrode 26 and the second roller electrode 28 by driving the welding power source unit 50.

Figure 7A:
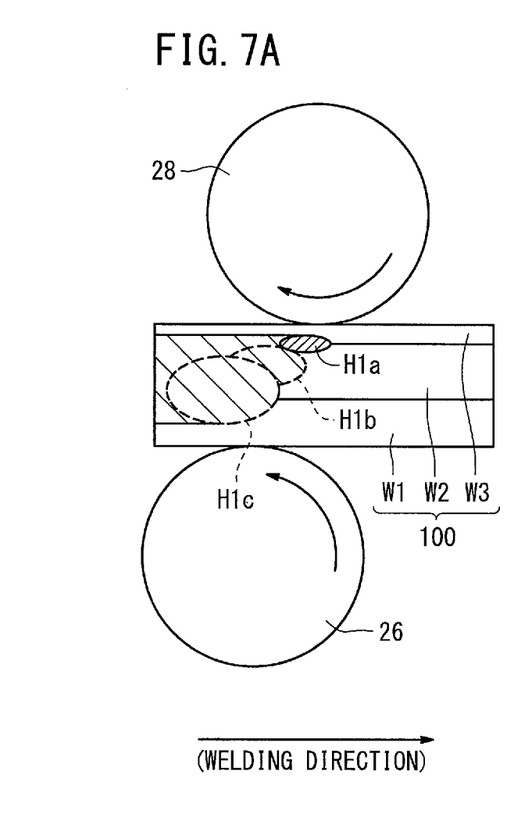
FIG. 7A is an explanatory diagram showing a heated site of the stacked assembly at a time T1.

Upon doing so, in the stacked assembly 100, an inclined current pathway, which is inclined in a direction opposite to the welding direction, is formed from the second roller electrode 28 toward the first roller electrode 26. Therefore, as shown in FIG. 7A, at a certain point in time T1, in the current pathway, resistance heating takes place at a contact site (first site) H1a between the workpiece W2 and the workpiece W3, at a site H1b in the workpiece W2 slightly more rearwardly than the contact site H1a, and at a contact site H1c between the workpiece W1 and the workpiece W2 slightly more rearwardly than the site H1b.

Figure 7B:
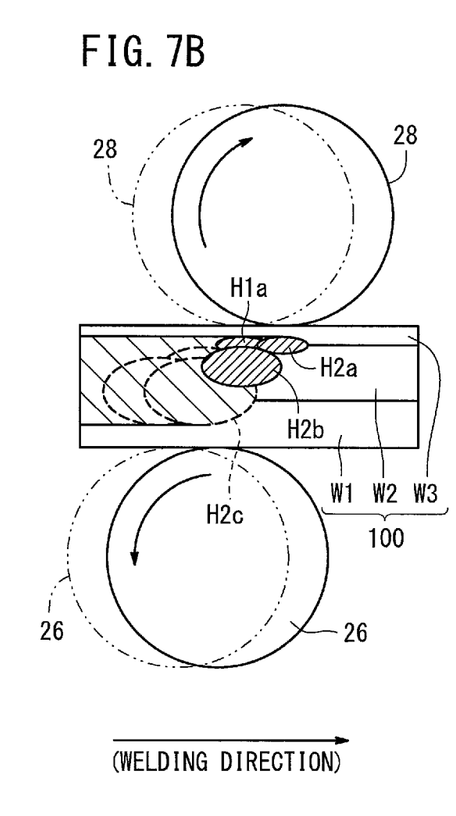
FIG. 7B is an explanatory diagram showing a heated site at a time T2 that is advanced beyond time T1.

In addition, as shown in FIG. 7B, at a point in time T2 after time T1, since the first roller electrode 26 and the second roller electrode 28 are moved slightly in the welding direction with respect to the stacked assembly 100, resistance heating then takes place at a contact site (second site) H2a, which is shifted slightly in the welding direction from the contact site H1a, at a site H2b (third site), which is shifted slightly in the welding direction from the site H1b, and at a contact site H2c, which is shifted slightly in the welding direction from the contact site H1c. At this time, the contact site H1a, which has already been heated, is subjected to further heating by the contact site H2a and the contact site H2b.

Figure 7C:
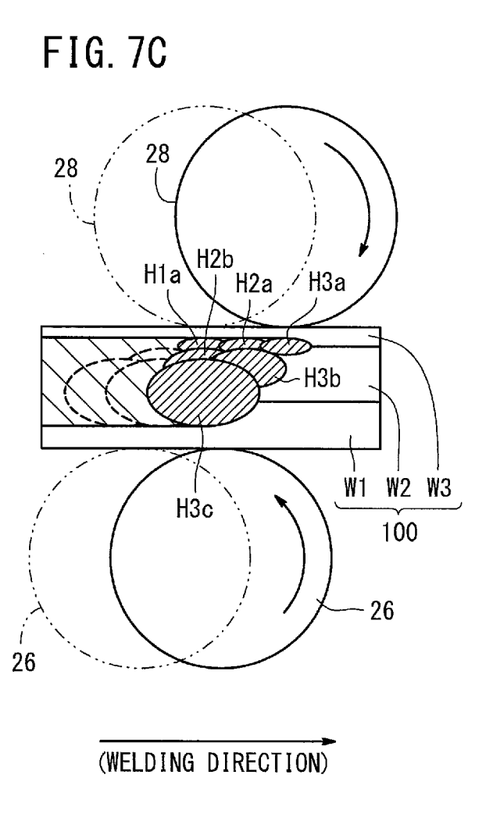
FIG. 7C is an explanatory diagram showing a heated site at a time T3 that is advanced beyond time T2.

In addition, as shown in FIG. 7C, at a point in time T3 after time T2, similar to the case of time T2, resistance heating then takes place at a contact site H3a, which is shifted slightly in the welding direction from the contact site H2a, at a contact site H3b, which is shifted slightly in the welding direction from the site H2b, and at a contact site H3c, which is shifted slightly in the welding direction from the contact site H2c.

At this time, since the contact site H3c is a contact site between the workpiece W1 and the workpiece W2, which are greater in thickness and greater in specific resistance than the workpiece W3, sufficient resistance heating takes place.

In the foregoing manner, by performing seam welding in a state in which the second roller electrode 28 is arranged more forwardly than the first roller electrode 26, since the contact site H1*a* between the workpiece (thinnest workpiece) W3 and the workpiece W2 for which inadequate heating is easy to occur are sufficiently heated and melted, nuggets that are sufficiently large in size can be formed at the contact site between the workpiece W2 and the workpiece W3.

Further, according to the present embodiment, because the nuggets that are formed at the contact site H3*c* grow up to the contact site between the workpiece W2 and the workpiece W3, nuggets which are well-proportioned as a whole can be obtained. Consequently, this leads to the workpiece W1 and the workpiece W2 being bonded together firmly, as well as the workpiece W2 and the workpiece W3 being bonded together firmly.

Thereafter, at a point in time that completion of welding by the first roller electrode 26 and the second roller electrode 28 is reached, seam welding is brought to an end (step S6). More specifically, the welding machine controller 62 controls the welding power source unit 50 and stops current between the first roller electrode 26 and the second roller electrode 28. Further, by adjusting the pressures inside the first and second cylinders, the first roller electrode 26 and the second roller electrode 28 are separated away from the stacked assembly 100. At this time, the current cycle of seam welding is brought to an end.

According to the present embodiment, since the second roller electrode 28 in contact with the workpiece (thinnest workpiece) W3 is disposed more forwardly in the welding direction than the first roller electrode 26, in the stacked assembly 100, a current pathway, which is inclined in a direction opposite to the welding direction, is formed from the second roller electrode 28 toward the first roller electrode 26. When this is done, in the current pathway, at a certain point in time T1, resistance heating occurs at the contact site (first contact site) H1*a* between the workpiece W3 and the workpiece W2 adjacent to the workpiece W3. In addition, at the point in time T2 that the first roller electrode 26 and the second roller electrode 28 are moved relatively with respect to the stacked assembly 100, the second site H2*a* adjacent to the first site H1*a* in the welding direction is heated, together with the third site H2*b* adjacent to the first roller electrode 26 side of the first site H1*a* being heated. At this time, the first site H1*a*, which already has been heated, is increased in heat further by the second site H2*a* and the third site H2*b*, and therefore, a nugget (well-proportioned nugget) of a sufficient size is formed at the first site H1*a*. Consequently, a joint is obtained which is superior in bonding strength.

Further, according to the present embodiment, compared to a situation in which the positions of the first roller electrode 26 and the second roller electrode 28 in the welding direction are aligned, the contact area S1 of the first roller electrode 26 with respect to the workpiece W1, and the contact area S2 of the second roller electrode 28 with respect to the workpiece W3 can be increased. Consequently, since the current density of the current pathway is comparatively small, even in the case that the current value flowing between the first roller electrode 26 and the second roller electrode 28 is increased, the occurrence of welding debris can suitably be suppressed.

Furthermore, according to the present embodiment, since the angle of inclination θ is set corresponding to the ratio R of the thickness D0 of the stacked assembly 100 with respect to the thickness D2 of the workpiece W3, nuggets that are sufficiently large in size can efficiently be formed in the stacked assembly 100. In addition, since the angle of inclination θ is set to 5° or less, excessive separation between the first roller electrode 26 and the second roller electrode 28 can be suppressed. Consequently, nuggets of sufficient size can be formed more effectively in the stacked assembly 100.

The present invention will be described in greater detail by presenting the following exemplary embodiment according to the present invention.

First Example

Figure 8:
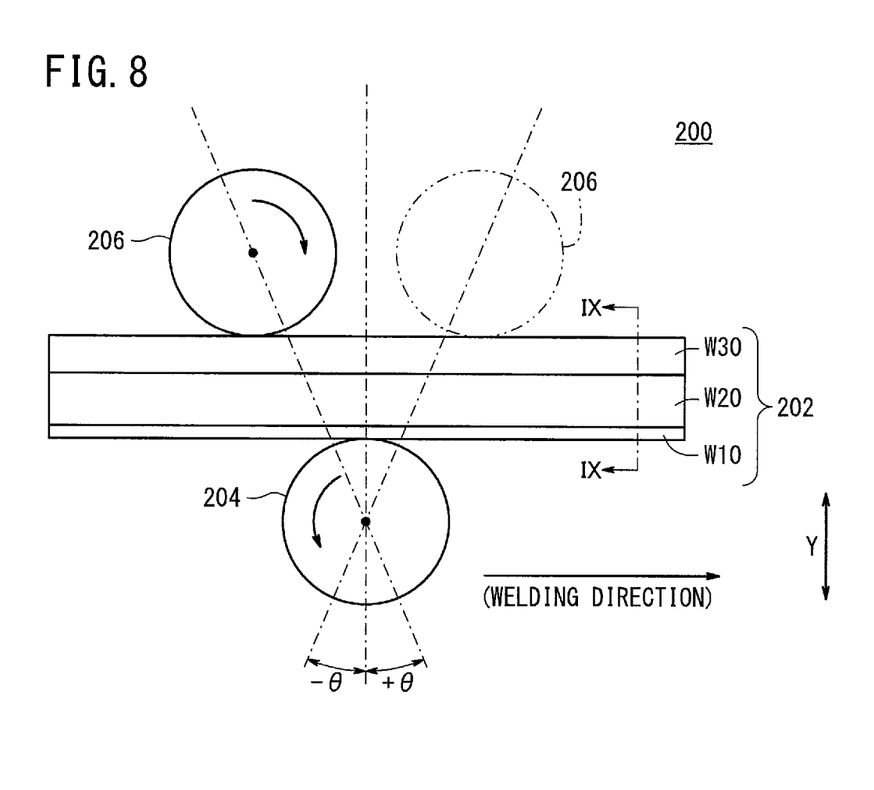
FIG. 8 is a schematic view of a seam welding device according to a first exemplary embodiment of the present invention.
Figure 9:
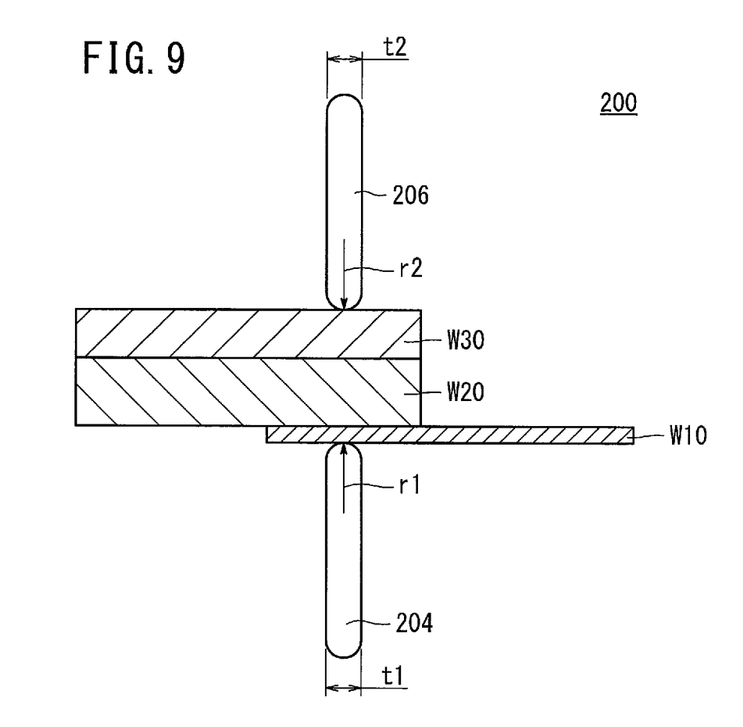
FIG. 9 is a cross-sectional view taken along line IX-IX of FIG. 8.

With the present exemplary embodiment, as shown in FIGS. 8 and 9, using a seam welding device 200 having the same structure as the above-described seam welding device 10, after seam welding was performed on a stacked assembly 202 as an object to be welded, a shear strength test was performed.

As the stacked assembly 202, there were stacked in this order a workpiece W10 (JAC270F) with a plate thickness of 0.65 mm, a workpiece W20 (JSC590R) with a plate thickness of 1.80 mm, and a workpiece W30 (JSC590R) with a plate thickness of 1.40 mm. More specifically, the plate thickness R of the stacked assembly 202 was greater than 5 at roughly 5.9, as determined from the equation R=(1.40+1.80+0.65)/0.65.

With the seam welding device 200 according to the present exemplary embodiment, a first roller electrode 204 was arranged on the side of the workpiece (thinnest workpiece) W10, and a second roller electrode 206 was arranged on the side of the workpiece W30.

For each of the first roller electrode 204 and the second roller electrode 206, water-cooled roller electrodes constituted from a copper chromium alloy (CrCu) were used. Further, a thickness t1 of the first roller electrode 204 was set to 10 mm, and the radius of curvature r1 of the outer circumferential surface thereof was set to 15 mm. A thickness t2 of the second roller electrode 206 was set to 10 mm, and the radius of curvature r2 of the outer circumferential surface thereof was set to 100 mm.

As welding conditions for the present exemplary embodiment, the welding speed was set to 4 m/min, the applied pressure was 450 kgf, a current-supplying cycle with an energization time of 6 msec and a rest time 6 msec was used, and the up-slope time was set to 150 msec.

Figure 10:
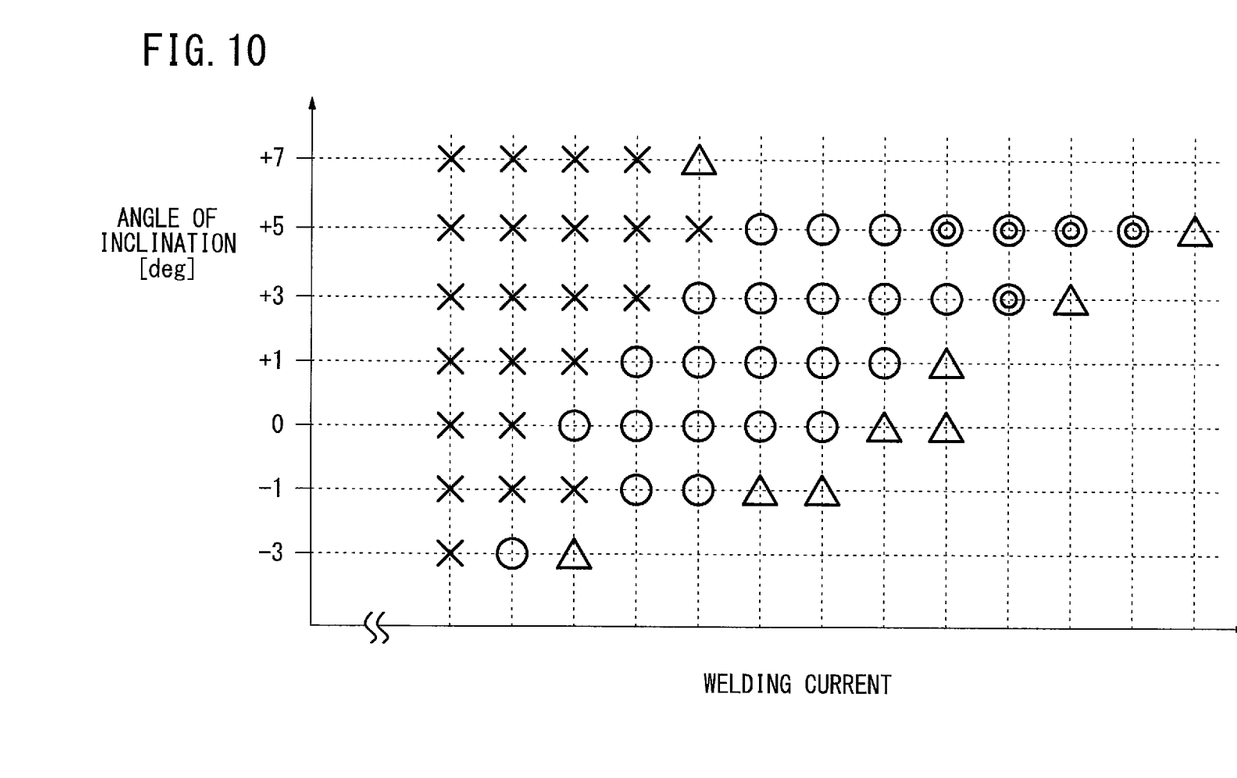
FIG. 10 is a graph showing experimental results of the exemplary embodiment of FIG. 8.

Test results according to the present exemplary embodiment are shown in FIG. 10. In FIG. 10, the welding current is shown on the horizontal axis, and the angle of inclination is shown on the vertical axis. In FIG. 10, ⊚ indicates a base material fractured sample in which debris was not generated, ○ indicates an interfacial fractured sample in which debris was not generated, Δ indicates a base material fractured sample in which debris was generated, and X indicates a sample in which peeling occurred without generation of debris. More specifically, the portions indicated by ⊚ and ○ imply that the heat input balance of the respective workpieces W10, W20, W30 was favorable.

According to the test results, in the case that the second roller electrode 206 was disposed more forwardly than the first roller electrode 204 (i.e., in the case that the angle of inclination was −1 degrees and −3 degrees), compared to a case in which the angle of inclination is zero degrees, the welding current width became narrow with the sample ○.

In the case that the angle of inclination was +1 degrees, compared to the angle of inclination being zero degrees, although the welding current width for the sample ○ was the same, the region for the sample ○ was shifted toward the high current side. In the case that the angle of inclination was +3 degrees, compared to the angle of inclination being +1 degrees, the region for the sample ◯ was shifted further toward the high current side, while in part, the results of the sample ⊚ could be obtained. In the case that the angle of inclination was +5 degrees, compared to the angle of inclination being +3 degrees, the welding current width for the sample ⊚ was widened. In the case that the angle of inclination was +7 degrees, the results for samples ◯ and ⊚ could not be obtained.

In the foregoing manner, in the case that the plate thickness ratio R is greater than 5, rather than with the angle of inclination being zero degrees, it was proven that weldability was improved when the angle of inclination resided within a range of $0°≤θ≤5°$. Further, it was proven that weldability was further improved when the angle of inclination resided within the range of $3°≤θ≤5°$.

The present invention is not limited to the embodiments described above, and it is a matter of course that various additional or modified structures could be adopted therein without deviating from the essential gist of the present invention.

Figure 11:
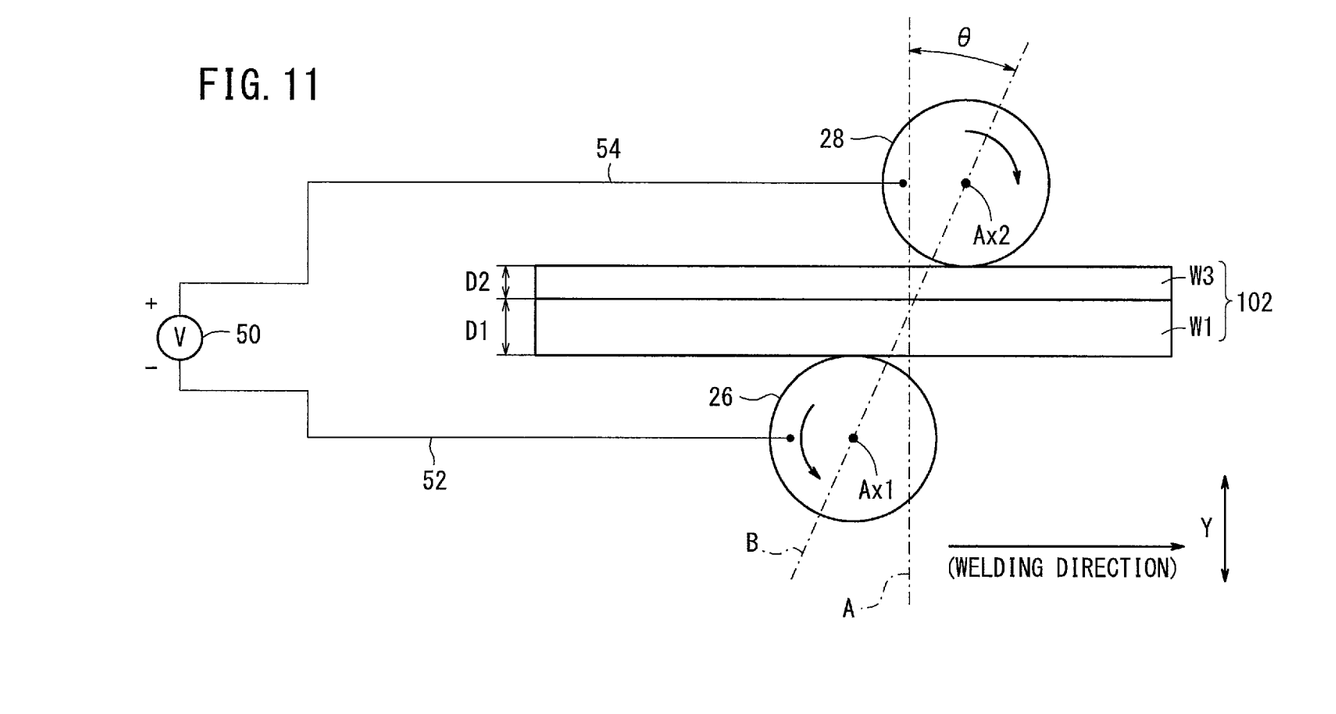
FIG. 11 is an explanatory drawing for describing a seam welding method according to a modified example of the present invention.

For example, the seam welding method according to the present invention is not limited to the example of performing seam welding with respect to a stacked assembly 100 that is made up by stacking three workpieces W1, W2, W3. For example, as shown in FIG. 11, the same effects and advantages of the aforementioned embodiment can be offered, even in the case that seam welding is carried out with respect to a stacked assembly 102 that is constituted by stacking two workpieces W1 and W3. The same holds true for a case in which seam welding is carried out with respect to a stacked assembly that is constituted by stacking four or more workpieces.

The invention claimed is:

1. A seam welding method for performing seam welding by sandwiching a stacked assembly between a pair of roller electrodes, the stacked assembly comprising a plurality of workpieces stacked, together with arranging a thinnest workpiece having a smallest thickness on an outermost side;
   wherein the pair of roller electrodes are connected to a welding power source such that the pair of roller electrodes have opposite polarity with respect to each other, and
   in a state in which one of the roller electrodes in contact with the thinnest workpiece is arranged more forwardly in a welding direction than the other of the pair of the roller electrodes, supply of current is carried out between the pair of roller electrodes while the pair of roller electrodes is moved relatively with respect to the stacked assembly, so that a current pathway inclined in a direction opposite to the welding direction is formed, the current pathway being inclined more from the one of the roller electrodes toward the other of the pair of the roller electrodes.

2. The seam welding method according to claim 1, comprising:
   a calculating step of calculating a ratio of a thickness of the stacked assembly with respect to the thickness of the thinnest workpiece based on plate thickness information input to an input unit of a seam welding device; and
   a setting step of setting an angle of inclination along the welding direction of a line segment that passes through axes of rotation of the respective roller electrodes with respect to a line segment along a stacking direction of the stacked assembly, depending on the ratio calculated in the calculating step.

3. The seam welding method according to claim 2, wherein in the setting step, the angle of inclination is set to 5° or less.

4. A seam welding device that performs seam welding by sandwiching a stacked assembly between a pair of roller electrodes, the stacked assembly comprising a plurality of workpieces stacked, together with arranging a thinnest workpiece having a smallest thickness on an outermost side;
   wherein the pair of roller electrodes are connected to a welding power source such that the pair of roller electrodes have opposite polarity with respect to each other,
   one of the roller electrodes in contact with the thinnest workpiece is arranged more forwardly in a welding direction than the other of the pair of the roller electrodes, and
   a current pathway inclined in a direction opposite to the welding direction is formed in the seam welding, the current pathway being inclined more from the one of the roller electrodes toward the other of the pair of the roller electrodes.

5. The seam welding device according to claim 4, comprising:
   an input unit configured to be input plate thickness information,
   a ratio calculating unit configured to calculate a ratio of a thickness of the stacked assembly with respect to the thickness of the thinnest workpiece based on the plate thickness information input to the input unit; and
   an inclination angle setting unit configured to set an angle of inclination along the welding direction of a line segment that passes through axes of rotation of the respective roller electrodes with respect to a line segment along a stacking direction of the stacked assembly, based on the ratio calculated by the ratio calculating unit.

6. The seam welding device according to claim 5, wherein the angle of inclination is set to 5° or less.

* * * * *